United States Patent
Roh et al.

(10) Patent No.: US 8,357,300 B2
(45) Date of Patent: Jan. 22, 2013

(54) METHODS AND MATERIALS FOR SELECTIVE BORON ADSORPTION FROM AQUEOUS SOLUTION

(75) Inventors: Il Juhn Roh, San Ramon, CA (US); Mark Wilf, San Diego, CA (US); Craig R. Bartels, San Diego, CA (US)

(73) Assignee: Hydranautics, Oceanside, CA (US)

( * ) Notice: Subject to any disclaimer, the term of this patent is extended or adjusted under 35 U.S.C. 154(b) by 346 days.

(21) Appl. No.: 12/856,755

(22) Filed: Aug. 16, 2010

(65) Prior Publication Data
US 2012/0037565 A1 Feb. 16, 2012

(51) Int. Cl.
B01D 61/00 (2006.01)
B01D 11/00 (2006.01)
C02F 1/26 (2006.01)
B01D 63/00 (2006.01)

(52) U.S. Cl. ........ 210/652; 210/650; 210/651; 210/634; 210/257.2

(58) Field of Classification Search .................. 210/634, 210/651, 257.2, 195.1; 252/175, 180
See application file for complete search history.

(56) References Cited

U.S. PATENT DOCUMENTS

| | | | |
|---|---|---|---|
| 2,402,959 A | 7/1946 | Gustafson et al. | |
| 2,813,838 A | 11/1957 | Lyman et al. | |
| 3,856,670 A | 12/1974 | Peterson | |
| 3,953,580 A | 4/1976 | Allen et al. | |
| 4,366,062 A | 12/1982 | Kurihara et al. | |
| 4,755,298 A | 7/1988 | Grinstead | |
| 5,250,185 A | 10/1993 | Tao et al. | |
| 5,876,602 A | 3/1999 | Jons et al. | |
| 5,925,255 A | 7/1999 | Mukhopadhyay | |
| 6,054,050 A | 4/2000 | Dyke | |
| 6,120,689 A | 9/2000 | Tonelli et al. | |
| 6,267,891 B1 | 7/2001 | Tonelli et al. | |
| 6,375,842 B1 | 4/2002 | Graham | |
| 6,398,865 B1 | 6/2002 | Morita et al. | |

(Continued)

FOREIGN PATENT DOCUMENTS

FR 2554732 A1 5/1985

(Continued)

OTHER PUBLICATIONS

Magara et al.: "Development of Boron Reduction System for Sea Water Desalination," Desalination, 118:25-34 (1998).

(Continued)

*Primary Examiner* — Ana Fortuna
(74) *Attorney, Agent, or Firm* — Panitch Schwarze Belisario & Nadel LLP

(57) ABSTRACT

A method for reducing a boron concentration in a boron-containing aqueous liquid involves administering micelle(s) for selective boron adsorption to the boron-containing aqueous liquid to produce boron-bonded micelle(s), wherein the micelle(s) comprise a reaction product of an N-substituted-glucamine and a glycidyl ether; passing the micelle-containing aqueous liquid through a membrane to separate the boron-bonded micelle(s) from the aqueous liquid; and recovering a permeate having a reduced boron concentration from the membrane. A material capable of selectively adsorbing boron from a boron-containing aqueous liquid contains at least one micelle having a hydrophobic tail and a head comprising a hydrophilic functional group having formula (I):

$$R_1\text{—}O\text{-}A \qquad (I)$$

$R_1$ represents a hydrocarbon group selected from the group consisting of substituted and unsubstituted aromatic, linear aliphatic, and branched aliphatic hydrocarbon groups and mixtures thereof, and A contains hydroxyl and amine groups.

24 Claims, 7 Drawing Sheets

U.S. PATENT DOCUMENTS

| | | | |
|---|---|---|---|
| 6,508,936 | B1 | 1/2003 | Hassan |
| 6,709,590 | B1 | 3/2004 | Hirose |
| 6,805,796 | B2 | 10/2004 | Hirose et al. |
| 6,821,430 | B2 | 11/2004 | Andou et al. |
| 7,097,769 | B2 | 8/2006 | Liberman et al. |
| 7,279,097 | B2 | 10/2007 | Tomioka et al. |
| 7,368,058 | B2 | 5/2008 | Nishikawa et al. |
| 7,442,309 | B2 | 10/2008 | Wilf et al. |
| 7,491,334 | B2 * | 2/2009 | Comstock .................... 210/652 |
| 7,618,538 | B2 * | 11/2009 | Palacios Donaque et al. ............... 210/652 |
| 2002/0108900 | A1 | 8/2002 | Hirose et al. |
| 2003/0230531 | A1 | 12/2003 | Wilf et al. |
| 2004/0065617 | A1 | 4/2004 | Wilf et al. |
| 2008/0035565 | A1 | 2/2008 | Enric et al. |
| 2008/0135478 | A1 * | 6/2008 | Zuback et al. ............... 210/638 |

FOREIGN PATENT DOCUMENTS

| | | |
|---|---|---|
| JP | 10-085743 A | 4/1998 |
| JP | 10-225682 A | 8/1998 |
| JP | 11-138165 A | 5/1999 |
| JP | 11-197663 A | 7/1999 |
| JP | 2001-269543 A | 10/2001 |
| JP | 2005-246281 A | 9/2005 |
| WO | 2005/056166 A1 | 6/2005 |

OTHER PUBLICATIONS

Prats et al.: "Analysis of the Influence of pH and Pressure on the Elimination of Boron in Reverse Osmosis", Desalination, 128:269-273 (2000).

Stumm et al.: "An Introduction Emphasizing Chemical Equilibria in Natural Waters," Aquatic Chemistry, John Wiley & Sons, p. 207 (Apr. 1981).

Pastor et al .: "Influence of pH in the Elimination of Boron by Means of Reverse Osmosis," Desalination, 140:145-152 (2001).

Glueckstern et al: "Advanced Concept of Large Seawater Desalination Systems for Israel," Desalination, 119:33-45 (1998).

Glueckstern et al.: "The Impact of R&D on New Technologies, Novel Design Concepts and Advanced Operating Procedures on the Cost of Water Desalination," Desalination, 139:217-228 (2001).

Nissim Nadav: "Boron removal from seawater reverse osmosis permeate utilizing selective ion exchange resin", Desalination, 124; pp. 131-135 (1999).

B.J. Marinas: "Reverse Osmosis technology for waste water reuse"; Water Science & Technology; 24 (9); pp. 215-227 (1991).

Okay et al.: "Boron Pollution in the Simav River, Turkey and Various Methods of Boron Removal", Water Res., vol. 19, No. 7, pp. 857-862 (1985).

Kabay, et al: "Removal and recovery of boron from geothermal wastewater by selective ion exchange resins. I Laboratory Tests", Reactive & Functional Polymers, 60, pp. 163-170 (2004).

Inukai et al.: "Removal of boron(III) by N-methylglucamine-type cellulose derivatives with higher adsorption rate", Analytica Chimica Acta, 511, pp. 261-265 (2004).

Kaftan et al.: "Synthesis, characterization and application of a novel sorbent, glucamine-modified MCM-41, for the removal/ preconcentration of boron from waters", Analytica Chimica Acta, 547, pp. 31-41 (2005).

Bicak et al.: "Modification of crosslinked glycidyl methacrylate-based polymers for boron-specific column extraction", Reactive & Functional Polymers, 47, pp. 175-184 (2001).

* cited by examiner

Fig. 4: Boron Rejection vs. HGE-MGA Concentration

Fig. 5: Boron concentration vs. pH

Fig. 6: Boron Rejection vs. pH

Fig. 7: Boron rejection using inventive materials repeatedly, followed by regeneration

METHODS AND MATERIALS FOR SELECTIVE BORON ADSORPTION FROM AQUEOUS SOLUTION

BACKGROUND OF THE INVENTION

Boron is an essential plant nutrient and is also thought to be necessary for the health of mammals. However, at high concentrations, boron can be toxic to both plants and mammals, affecting plant growth and reproductive and nervous systems. Boron occurs naturally in seawater and in some well waters and springs, and is also present in waste waters from manufacturing of metals, microelectronics, and fertilizers, for example. Accordingly, effective methods for removing boron from aqueous solutions are required.

Methods for removing boron from geothermal wastewater using selective ion exchange resins of the N-glucamine type have been described (Kabay et al. *Reactive & Functional Polymers;* 60 (2004); 163-170). N-methyl-glucamine-type cellulose derivatives have also been described for removal of boron from wastewater (Inukai et al. *Analytica Chimica Acta* 511 (2004); 261-265). Peterson (U.S. Pat. No. 3,856,670) teaches the removal of boron from aqueous solutions using ion exchange phenolic resins containing aromatic ortho-hydroxy carboxylic groups cross-linked with aldehydes. Other insoluble resins and supports for boron absorption are also known (see U.S. Pat. No. 2,813,838, for example), including N-methyl glucamine modified inorganic supports and N-methyl-glucamine modified terpolymers of glycidyl methacrylate with methylmethacrylate and divinyl benzene in spherical bead form (Kaftan et al. *Analytica Chimica Acta;* 547 (2005); 31-41; Bicak et al. *Reactive & Functional Polymers* 47 (2001); 175-184). Such boron adsorption techniques are expensive due to the cost of the ion exchange resin and supporting processes. Further, such methods do not remove basic salinity, so if the boron-containing water has high salinity, additional processes, such as RO or distillation, are necessary to lower the salinity.

Removal of boron from seawater also presents an environmental concern, since seawater typically contains about 4 to 7 ppm boron, in addition to a variety of water-soluble salts. Treatment of seawater has become a significant issue since it requires reduction of both salinity and boron. Traditional methods for purifying (desalinating) seawater for drinking and irrigation purposes utilize reverse osmosis (RO) membranes, which are effective at significantly reducing the concentrations of all dissolved ions in the seawater. Although the reduction of the majority of dissolved ions by polyamide reverse osmosis membranes is about 98% to about 99%, the rejection rate of boron by these membranes is much lower, typically in the 70%-90% range, and may be even lower at high feed water temperatures (greater than about 25° C.).

The significantly lower rejection rate of boron by polyamide membranes may be explained by the very low dissociation rate of boric species at neutral pH. However, this boric species dissociation rate increases with pH and reaches 50% dissociation at a pH of 8.6 to 9.8, depending on the ionic strength of the solution and the temperature (W. Stumm, et al. *Aquatic Chemistry,* John Wiley & Sons (1981)). Consequently, an increased boron rejection rate is achievable at high pH, thus making possible appreciable reduction of boron concentration by reverse osmosis.

Magara et al. (*Desalination* 118:25-34 (1998)) and Prats et al. (*Desalination* 128: 269-273 (2000)) describe methods for reducing boron concentration using two-pass reverse osmosis systems. In these systems, the pH of the permeate from the first pass is increased before it is passed through the RO membrane in the second pass in order to improve the boron rejection. The term "permeate" is known in the art to refer to reverse osmosis product water. Because the RO permeate from these systems has low salinity and low concentration of scale-forming ions, even adjustment of the pH to high levels does not result in scale formation.

An example of a similar methodology applied to high salinity water is described by Tao et al. (U.S. Pat. No. 5,250,185), which involves the application of a high pH RO processing method to oilfield-produced water. In order to prevent scaling of the reverse osmosis system by carbonate salts, the feed water is softened prior to adjustment of the pH to a level greater than 9.5. Tao et al. teach that the high pH is necessary to obtain the desired increase in boron rejection. Additionally, Mukhopadhyay (U.S. Pat. No. 5,925,255) describes the treatment of brackish and low salinity water by reverse osmosis, in which the hardness of the RO feed water is removed by a weak acid cation exchange resin.

Finally, U.S. Pat. No. 7,442,309 of Wilf et al. describes a desalination treatment method for high salinity, boron-containing liquid which includes a method of reducing the boron concentration. The method involves increasing the pH of the non-softened, high salinity liquid to about 8 to 9.5 and passing the pH-increased, non-softened, high salinity liquid through at least one reverse osmosis device. The resulting permeate has a boron concentration of less than about 2 ppm.

It would be desirable to be able to significantly reduce the concentration of boron in both low and high salinity aqueous solutions using straightforward processes that would be attractive due to lower operating costs and superior effectiveness relative to known methods.

SUMMARY OF THE INVENTION

A method for reducing a boron concentration in a boron-containing aqueous liquid comprises:
(a) administering at least one micelle for selective boron adsorption to the boron-containing aqueous liquid to produce at least one boron-bonded micelle, wherein the at least one micelle comprises a reaction product of an N-substituted-glucamine and a glycidyl ether;
(b) passing the micelle-containing aqueous liquid through a membrane to separate the at least one boron-bonded micelle from the aqueous liquid; and
(c) recovering a permeate from the membrane, wherein the permeate has a reduced boron concentration.

According to the invention, a material capable of selectively adsorbing boron from a boron-containing aqueous liquid comprises at least one micelle having a hydrophobic tail and a head comprising a hydrophilic functional group having formula (I):

$$R_1\text{—O-A} \qquad (I)$$

wherein $R_1$ represents a hydrocarbon group selected from the group consisting of substituted and unsubstituted, aromatic, linear aliphatic, and branched aliphatic hydrocarbon groups and mixtures thereof, and wherein A comprises hydroxyl and amine groups.

According to another embodiment of the invention, a material capable of selectively adsorbing boron from a boron-containing aqueous liquid comprises at least one micelle comprising a reaction product of a N-substituted glucamine and a glycidyl ether.

BRIEF DESCRIPTION OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

The present invention is directed to a method for reducing the concentration of boron in boron-containing aqueous liquid, in which the resulting treated liquid, or permeate, has a substantially decreased boron concentration. The boron-containing aqueous liquid, which may have high or low salinity, may initially have a boron concentration of about 3 to about 100 ppm boron. For example, the method is appropriate for the treatment of seawater, water from other natural sources, wastewater, high purity water for semiconductor manufacturing, and produced water.

One embodiment provided by the invention comprises administering at least one micelle for selective boron adsorption to the boron-containing aqueous liquid to produce at least one boron-bonded micelle, passing the micelle-containing aqueous liquid through a membrane to separate the boron-bonded micelle(s) from the aqueous liquid, and recovering a permeate having a reduced boron concentration of less than about 2 ppm of boron. In a preferred embodiment, the permeate has a reduced boron concentration of less than about 1 ppm, and most preferably less than about 0.5 ppm. The presently preferred method of measuring boron concentration is ICAP (Ion Coupled Argon Plasma). However, boron determination may be accomplished by any technique known to those in the art.

The micelles for selective boron adsorption comprise boron adsorbing groups, that is, groups that will form complexes with boron. Preferably, the micelle(s) are administered to the boron-containing aqueous liquid at a ratio of at least about 10:1 (concentration of boron adsorbing groups: concentration of boron in the aqueous liquid), more preferably at least about 50:1, most preferably at least about 100:1. For example, it would be preferred to administer to an aqueous solution containing about 10 ppm boron a solution containing at least about 100 ppm micelle forming compound, more preferably at least about 500 ppm micelle forming compound, most preferably at least about 1000 ppm micelle forming compound.

In one embodiment, the boron-containing aqueous liquid is a high salinity liquid, such as seawater. The term "high salinity liquid" may be understood to mean any liquid having a salt content of at least about 2000 ppm of total dissolved salts (TDS), and more preferably greater than about 10,000 ppm TDS. In one embodiment, the high salinity, boron-containing liquid is seawater, which typically has a TDS of about 32,000 to 44,000 ppm, but any high salinity liquid which contains boron may be treated by the method of the invention.

As previously explained, the method is not limited to the treatment of boron-containing seawater or other high salinity liquids. Rather, any boron-containing aqueous solution may be treated, including without limitation water from natural sources (such as lakes or streams), wastewater, well water, water from second pass treatment processes used to polish sea water RO permeate, high purity water for semiconductor manufacturing (which requires very low boron levels), and produced water (such as the oilfield produced water described in U.S. Pat. No. 5,250,185 of Tao, et al.).

Figure 1:
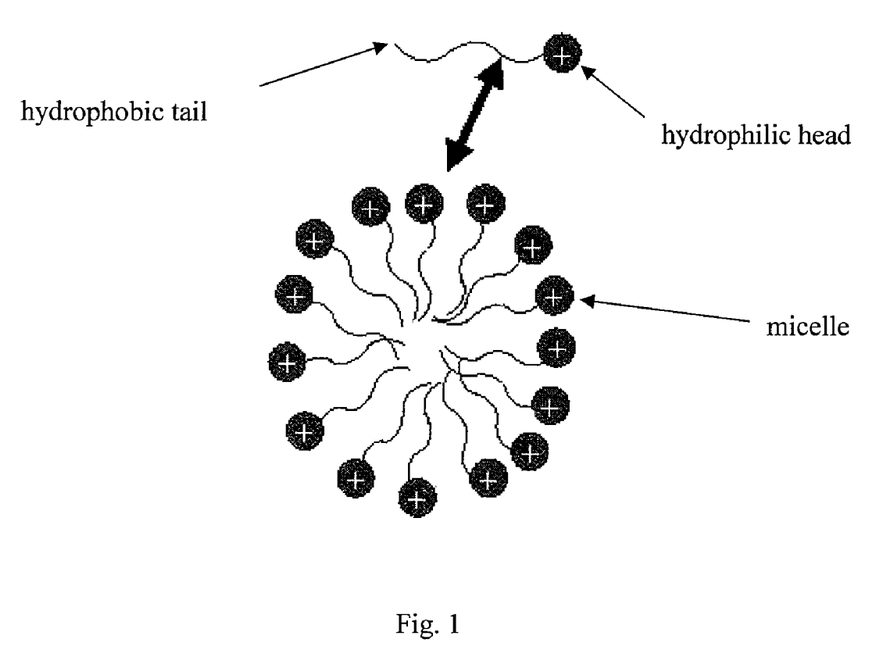
FIG. 1 is a diagram of a micelle in aqueous solution.

Micelles are submicroscopic aggregations of molecules that act as colloidal particles. In polar media, such as water, amphiphiles (molecules having distinct hydrophobic and hydrophilic portions) tend to form micelles. Specifically, the hydrophobic parts (tail groups) of the amphiphiles forming the micelles tend to locate themselves away from the polar phase, while the hydrophilic polar parts (head groups) of the molecules tend to locate at the polar micelle solvent interface. In other words, a typical micelle in aqueous solution forms an aggregate with the hydrophilic "head" regions in contact with surrounding solvent, sequestering the hydrophobic tail regions in the micelle center (see FIG. 1). While most micelles are approximately spherical in shape because this is usually the lowest surface area configuration, other phases, including shapes such as ellipsoids, cylinders, and bilayers, are also possible, depending on the conditions and composition of the system.

The micelles for selective boron adsorption for use in the method of the invention are preferably formed from the reaction product of an N-substituted glucamine and a glycidyl ether. Such materials, described in more detail below, are readily available from commercial sources and/or are easy to prepare, and react in a straightforward fashion. The resulting materials have a linear chemical structure containing a hydrophobic tail and a hydrophilic head (N-substituted glucamine), which acts as a boron-selective functional group. Such materials have amphiphilic structures and form nano- to micron-sized micelles, such as those having a diameter of about 0.01 microns (10 nm) to about 100 microns, in aqueous solutions. These micelles provide a high density of boron-adsorbing groups at the surface and provide selective boron adsorption in aqueous solutions relative to micelles which lack such specific boron-adsorbing functional groups. The micelles have been shown to adsorb boron but not other salts present in the solution. Further, such micelles are more effective than solid particles, in which the functional groups may not be in contact with the boron-containing water.

Glucamines, as shown in Formula (A), are amines formed by the reduction of glucosylamine or of glucose oxime.

(A)

Appropriate N-substituted glucamine compounds for use in the present invention include N-alkyl-glucamines and N-aryl-glucamines. For examples, N-alkyl-glucamines within the scope of the present invention include, but are not limited to, those having substituted and unsubstituted alkyl groups containing about one to about 20 carbon atoms, such as substituted and unsubstituted N-methyl-, N-ethyl, N-propyl, N-butyl, N-pentyl, N-hexyl, N-heptyl, N-octyl, N-nonyl, N-decyl,

N-undecyl, N-dodecyl-glucamines, and N-alkyl-glucamines containing higher alkyl groups up to about 20 carbon atoms. Preferably, the appropriate glucamines have adjacent hydroxyl groups, such as in N-alkyl-d-glucamines. N-methyl-d-glucamine is also known as megulmine and 1-deoxy-1-methylaminosorbitol. As an example, N-ethyl-d-glucamine is shown in Formula (B).

(B)

N-aryl-glucamines within the scope of the present invention include glucamines in which the N atom is substituted with aryl groups such as phenyl, tolyl, benzyl, etc., including substituted aryl groups.

N-substituted glucamines are available from commercial sources or may be prepared from the reaction of D-glucose and the relevant alkyl amine by known methods (see, for example N. Bicak et al., *Reactive and Functional Polymers*, 47, 175 (2001)). Although N-substituted glucamines are preferred due to their relatively low cost and ease of preparation, analogous compounds containing fewer than six carbon atoms in the main chain are also within the scope of the invention. For example, compounds prepared from the reaction of pentose, tetrose, triose, hexose, and heptose, for example, and the relevant alkylamine by similar methods would also be acceptable, as would other compounds known or to be developed with similar structures having adjacent OH groups.

The micelles for selective boron adsorption according to the invention are prepared by reacting the N-substituted glucamine with a glycidyl ether. The specific glycidyl ether is not critical, and may be any glycidyl ether having an aromatic or aliphatic (linear or branched) substituent. For example, glycidyl ethers containing linear or branched, substituted or unsubstituted alkyl and aryl (such as substituted and unsubstituted phenyl, benzyl, tolyl, naphthyl) groups, and substituted and unsubstituted allyl groups, for example, would be appropriate. However, other glycidyl ethers that are known in the art or to be developed would also be appropriate for preparation of the micelles. The only limitation on the glycidyl ether is that it should react with an N-glucamine or similar compound to provide a product with a hydrophobic tail and sufficiently hydrophilic head that a micelle structure may be formed. Glycidyl ethers are readily available from chemical suppliers, such as Sigma-Aldrich. Particularly preferred glycidyl ethers are glycidyl hexadecyl ether (Formula (C)) and glycidyl 4-nonylphenylether (Formula (D)) because they are fairly inexpensive, may be reacted using a co-solvent, and form stable micelles in water.

(C)

(D)

The reaction of glycidyl ether and N-substituted glucamine may be performed at room temperature and pressure, such as by combining the reagents in a suitable organic solvent under an inert atmosphere, heating to an appropriate reaction temperature for a sufficient time, separating the reaction product from the solution (such as by filtration), and drying. The appropriate reaction temperature and time may be determined by routine experimentation and may vary depending on the specific reactants, but typical reaction temperatures are about 120 to about 160° C., more preferably about 20 to about 90° C., depending on the solvent used. Appropriate organic solvents include, for example, 1-methyl-2-pyrrolidinone, dimethylformamide, dimethylacetamide, and dimethylsulfoxide, but it is also within the scope of the invention to perform the reaction in the absence of solvent (neat). Importantly, the solvent must dissolve both of the monomers. If the resulting product is also soluble in the solvent, non-solvents must be added after the reaction in order to precipitate the product. However, the non-solvents should not cause the monomers to precipitate. The reaction product is typically a solid that is collected on filter paper and rinsed for purification.

When the reaction product is dissolved in water at low concentrations, a clear solution results. However, as the concentration of the product is increased, the solution turns cloudy, which indicates that a second phase is being formed. The fact that no solid falls out of solution and no oil rises to the surface indicates that the micellar structure is formed and is stable. As the concentration is increased further and the solubility limit is reached, precipitation is observed and spherical micelles are being formed. Further evidence of micelle formation is provided by the fact that it is possible to filter the material with an ultrafiltration membrane, such as a membrane having a pore size of 0.02 micron. If micelles were not being formed, the material would be so small that it would pass through the ultrafiltration membrane.

As previously explained, the micelles for selective boron adsorption according to the invention have hydrophobic tails and heads containing hydrophilic functional groups. In a preferred embodiment, the hydrophilic functional group has formula (I):

$$R_1\text{—O-A} \tag{I}$$

wherein $R_1$ represents a hydrocarbon group, such as an aromatic hydrocarbon group, a linear aliphatic hydrocarbon group, a substituted or unsubstituted branched aliphatic hydrocarbon group, or a mixture thereof, and A comprises hydroxyl and amine groups. It may be understood that $R_1$ represents the substituent on the glycidyl ether and must be selected such that the compound remains water insoluble. For example, if glycidyl hexadecyl ether is used as the glycidyl ether, $R_1$ will be a linear alkyl group containing sixteen carbon atoms. Thus, $R_1$ is determined by the specific glycidyl ether that is used to form the micelle and is only limited by the specific glycidyl ether used in the micelle-forming reaction. Consequently, A is composed of functional groups originating from both the glycidyl ether (namely, —$CH_2CH(OH)$—$CH_2$) and from the N-substituted glucamine. Thus, A contains an amine group originating from the N-substituted glucamine and six hydroxyl groups. As previously explained, if an alternative compound is used rather than an N-glucamine, A will contain an amine group and fewer or greater than six hydroxyl groups.

More specifically, the hydrophilic functional groups preferably have formula (II):

$$R_1\text{—O-}A_2\text{-N}(R_2)\text{-}A_1 \tag{II}$$

$R_1$ is as defined above, representing the substituent originating on the glycidyl ether. $R_2$ represents the substituent on the N-substituted glucamine. Thus, $R_2$ may be the same as or different from $R_1$, and also represents a hydrocarbon group selected from the group consisting of substituted and unsubstituted aromatic, linear aliphatic, and branched aliphatic hydrocarbon groups and mixtures thereof. If $R_2$ is hydrophobic, it must be sufficiently short that the original monomer is hydrophilic and that the reaction product may be separated from the monomers. $A_1$ and $A_2$ may be the same or different and each comprises hydroxyl groups.

More specifically, the hydrophilic functional groups preferably have formula (III):

$$R_1-O-CH_2CH(OH)CH_2-NR_2-A_1 \quad (III)$$

As previously explained, $R_1$ and $R_2$ may be the same or different and each represents a hydrocarbon group selected from the group consisting of substituted and unsubstituted aromatic, linear aliphatic, and branched aliphatic hydrocarbon groups and mixtures thereof, and $A_1$ comprises hydroxyl groups.

In a preferred embodiment, the hydrophilic functional group ($A_1$) comprises Formula (VI):

$$-C_6H_8(OH)_5 \quad (VI)$$

In one preferred embodiment, $R_1$, representing the substituent on the glycidyl ether, has Formula (IV):

$$C_nH_{2n+1}(C_6H_4)_xC_mH_{2m}- \quad (IV)$$

wherein n is an integer from 8 to 20, x is an integer from 0 to 2, and m is an integer from 0 to 5. That is, the glycidyl ether may be alkyl, alkyl-aryl-alkyl, or aryl-alkyl substituted.

In one preferred embodiment, $R_2$, representing the substituent on the N-substituted glucamine, has Formula (V):

$$C_nH_{2n+1} \quad (V)$$

wherein n is an integer from 1 to 4.

The micelles are preferably added to the boron-containing liquid as a concentrated solution in advance of the membrane used for filtration. Sufficient time and mixing are required to ensure that the micelles are mixed with the boron-containing aqueous liquid and adequately contact the boron compounds. It has been found that micelle concentrations of above about 3000 ppm are particularly effective for most boron-containing solutions, but lower concentrations may be utilized if the particular application does not require such high rejection (see Example 5 below).

Following administration of the micelles to the boron-containing liquid, the boron becomes bonded to the micelles, as shown in Scheme 1.

Scheme 1

The liquid having boron-bonded micelles is then passed through a membrane to separate the boron-bonded micelles from the liquid. Preferably, the membrane is a microfiltration (MF), nanofiltration (NF), ultrafiltration (UF) or reverse osmosis (RO) membrane. Depending on the size of the micelle, it is within the scope of the invention to utilize any of these membrane types. Ultrafiltration may be run at very low pressures of less than about 30 psi, whereas nanofiltration is effective at pressures of 100 to 200 psi. The permeate that is recovered from the membrane typically has a 99-95% lower boron concentration than the original aqueous solution.

There are no specific limitations on the temperature and pressure for performing the method of the invention; typical conditions utilized for RO would be appropriate. Specifically, the method may be performed at temperatures of about 10° C. to about 45° C. The method may be performed at normal operating pressures of the membranes utilized, such as about 15 to about 1500 psi (about $1\times10^5$ to $10\times10^6$ Pa), and more preferably about 15 to about 800 psi (about $1\times10^5$ to $5\times10^6$ Pa).

The boron adsorption is preferably performed at a pH of greater than about 4.5, more preferably about 7.0 to about 9.0, most preferably at a pH of about 8.0. According to the present invention, the pH is preferably adjusted by treating the high salinity liquid with a base such as the preferred sodium hydroxide or calcium hydroxide. Other common bases, such as lime (calcium oxide), may also be used. In many cases, the native pH of the solution is such that no pH adjustment is necessary.

In a preferred embodiment, both the measurement and adjustment of the pH are performed in-line while the aqueous liquid flows. Following determination of the pH, a dosing pump, which is fed from a tank, injects the base (if needed) into the in-line fluid. However, as noted above, depending on the native pH of the boron-containing aqueous solution, pH adjustment may not be necessary. Ideally, the dosing pump has automatic feedback which automatically monitors and controls the amount of base which is added. No mixing is required because the base is mixed naturally with the aqueous liquid as it flows.

In one embodiment, the method further comprises steps for regenerating the micelles following removal of the boron from the boron-containing aqueous solution. Following filtration to remove the boron-bonded micelles from the aqueous solution, the micelles will have decreased boron-adsorbing ability due to adsorption of boron. That is, when the micelle becomes saturated with boron, it will no longer be able to adsorb any more boron. Accordingly, for regenerating the micelles (restoring the boron adsorbing ability of the boron bonded compounds), it is necessary to release the boron bonded to the micelles. It has been shown that the boron-bonded micelles will "release" boron at a low pH of about 1.0 to about 4.5, as shown in Example 7 below.

Regeneration may thus be accomplished by stirring the boron-saturated micelles in acidic solution, such as a 1N HCl solution. The pH of this solution is preferably less than about 4, more preferably less than about 3, and most preferably below about 2. After a stirring period, such as about 3 hours, the solution is filtered to yield the regenerated micelles. This regeneration may thus be accomplished in a straightforward manner in acid solution. It has been found that regenerated micelles may provide a boron rejection rate of 96%, close to the initial boron rejection.

Figure 2:
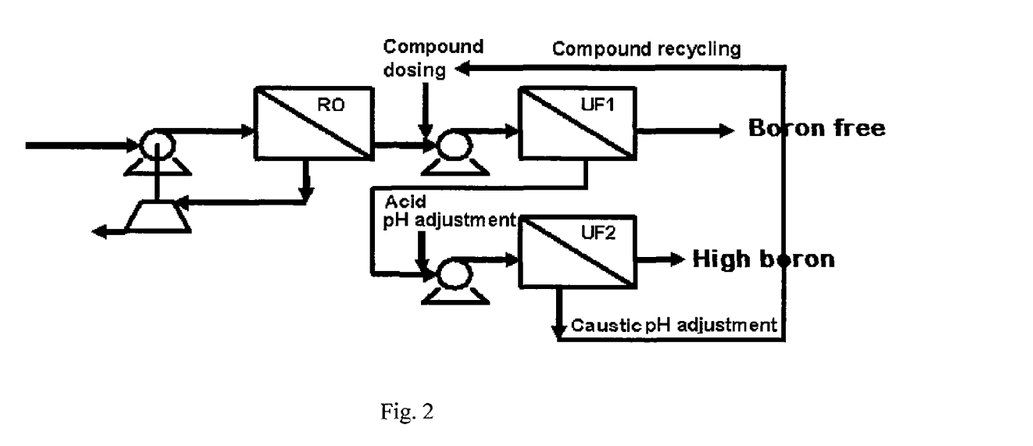
FIG. 2 is a schematic representation of a boron-reduction process according to one embodiment of the present invention.
Figure 3:
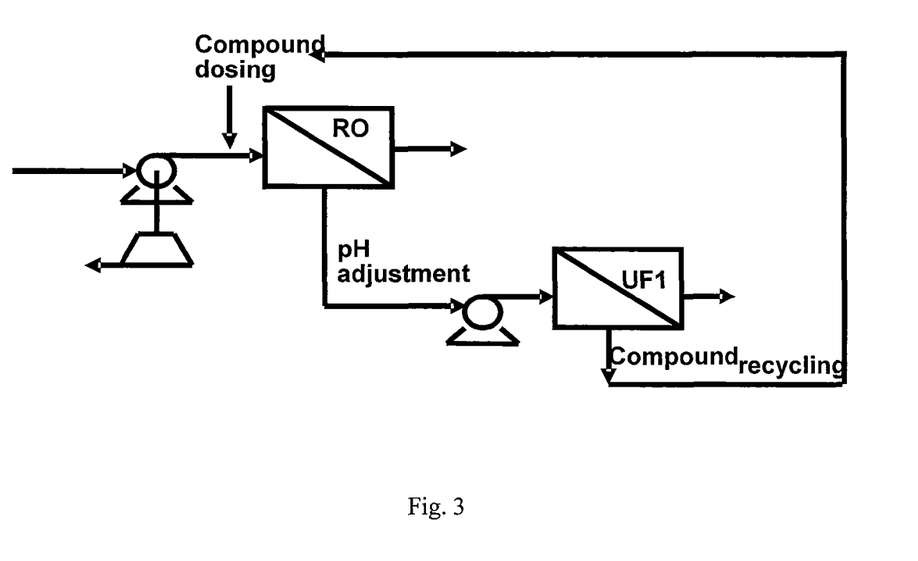
FIG. 3 is a schematic representation of a boron-reduction process according to another embodiment of the present invention.

When the boron-containing aqueous solution is to be treated by RO, two different sequences of process steps may be envisioned, as shown in FIGS. 2 and 3. In one embodiment, as shown in FIG. 2, the boron-containing solution is passed through a sea water reverse osmosis (SWRO) device RO at native pH. The resulting RO permeate still contains boron. The micelle(s) for selective boron adsorption are added (compound dosing) to the permeate to form a solution containing the micelles which bind with the boron. This solution is passed through a first ultrafiltration membrane UF1 which rejects the large micelles containing the boron. The UF filtrate is thus "boron free" and the UF retentate contains the boron-bonded micelles. The pH of the retentate is decreased by the addition of acid in-line, causing the boron to desorb from the micelles. Since the boron is now dissolved in solution, it is passed through a second ultrafiltration membrane UF2 and can be sent to waste "High boron." The concentrate of the UF2, containing the micelles is subjected to pH adjustment in-line by addition of NaOH to return the pH to a neutral level. The micellar compound is then reclaimed back in its original state and can be reused and returned to the compound dosing point shown in FIG. 2.

In a second embodiment, the boron adsorbing compound can be dosed before the seawater RO, thus utilizing the RO as the membrane for separating the boron-bonded micelles from the aqueous liquid. In this process, the micelles are formed in the seawater and bind the boron. The bound boron is then removed from the solution by SWRO. If it is desired to collect the micelles for reuse, the RO concentrate is adjusted to low pH to desorb the boron fro the boron-binding compound prior to passage through an ultrafiltration membrane.

This embodiment is depicted schematically in FIG. 3. The boron-containing solution is pressurized by a high pressure pump and then dosed with micelles for selective adsorption (compound dosing) prior to passage through a SWRO device RO. It is also possible (not shown in FIG. 3) to perform the compound dosing at lower pressure (prior to passage through the high pressure pump) for practical reasons. Following passage through the RO device, the resulting RO permeate has very low boron concentration. The RO concentrate is then adjusted to low pH in-line to desorb the boron from the boron-binding micelles, yielding a solution which is passed through ultrafiltration membrane UF1. The permeate solution goes to waste and the concentrate of UF1 containing the micelles is returned to the dosing compound point for re-use.

The method according to the invention is superior to known methods due to lower operating costs and superior effectiveness relative to known methods. The process is more cost effective than known methods because it can achieve effective boron reduction at very low pressures with a simple process design. Additionally, the method may enhance the rejection of a membrane that has sufficient salt rejection, but insufficient boron rejection. The resulting recovery system would be cheaper than an entire ion exchange process.

The invention also relates to materials that are capable of selectively adsorbing boron from a boron-containing aqueous liquid. A first material according to the invention comprises at least one micelle having a hydrophobic tail and a head comprising a hydrophilic functional group having formula (I):

$R_1$—O-A    (I)

wherein $R_1$ and A are as described previously.

A second material according to the invention comprises at least one micelle comprising a reaction product of an N-substituted glucamine and a glycidyl ether. The N-substituted glucamine and glycidyl ether and the method for preparing the micelle are as previously described.

The invention will now be described in conjunction with the following specific, non-limiting examples:

EXAMPLE 1

Reaction of MGA with HGE

Equal molar amounts of N-methyl-D-glucamine (MGA) and glycidyl hexadecyl ether (HGE) were added to a reactor filled with nitrogen and 1-methyl-2 pyrrolidinone (solvent) and equipped with a thermometer, agitator and reflux condenser at room temperature. The contents of the reactor were agitated while the solution was heated to and maintained at 80° C. for four hours. After the reaction, the solution was cooled to room temperature. The reaction product was separated from the solution by adding a non-solvent (20/80 water/acetone) for the product, followed by filtration, rinsed thoroughly with water and acetone, and dried in a vacuum oven at room temperature. Confirmation of the new product, which was obtained in a yield of greater than 89%, was obtained using IR. The product was determined to be pure because the unreacted monomers remained in solution; the non-solvent caused only the product to precipitate. When the product was added to water at a concentration of about 3000 ppm, micelles began to form, as evidenced by precipitation from the solution.

EXAMPLE 2

Reaction of NPGE with MGA

The method described in Example 1 was repeated using glycidyl 4-nonylphenyl ether (NPGE) instead of HGE. The resulting product was a white powder. Confirmation of the formation of a new product was provided from IR. When the product was added to water at a concentration of about 3000 ppm, micelles began to form, as evidenced by precipitation from the solution.

EXAMPLE 3

Investigation of Effect of Solvent on Reactions of MGA with Glycidyl Ethers

The methods described in Examples 1 and 2 were repeated in the absence of the 1-methyl-2 pyrrolidinone solvent. Similar results were observed: white powders were formed which formed micelles when added to water at a concentration of above about 3000 ppm.

EXAMPLE 4

Test of Boron Rejection

A comparative boron rejection test was performed using a nanofiltration membrane and two different solutions. An aqueous solution was prepared by combining 3000 ppm of the material prepared in Example 1 with 10 ppm boron and 1500 ppm sodium chloride at a pH of 8.0 (controlled by addition of NaOH). A second solution was prepared that contained only 10 ppm boron and 1500 ppm sodium chloride at pH 8.0. The two solutions were filtered with a nanofiltration membrane (ESNA2, commercially available from Hydranautics) at 100 psi pressure and the resulting boron concentrations of the permeates were measured using ICAP.

The boron rejections obtained by each solution were calculated and are shown in Table 1 below. It can be seen that the nanofiltration membrane (ESNA2) showed very low boron rejection (2.8%) in the absence of the HGE-MGA material in the solution. However, boron rejection increased dramatically when the HGE-MGA material was included in the solution. Specifically, the solution containing 3000 ppm of the HGE-MGA material exhibited 98.4% boron rejection by the membrane due to the adsorption of boron by the micelles.

TABLE 1

Boron rejection of HGE-MGA solutions

| Membrane | HGE-MGA Conc (ppm) | Boron rejection (%) |
|---|---|---|
| Nanofiltration membrane (ESNA2) | 0 | 2.8 |
| | 3000 | 98.4 |

EXAMPLE 5

Effect of Micelle Concentration on Boron Concentration

Varying concentrations ranging from 0 to 4500 ppm of the HGE-MGA material prepared in Example 1 were added to aqueous solutions containing 10 ppm boron and 1500 ppm sodium chloride. The pHs of the solutions were adjusted to 8.0 using NaOH or HCl as needed and the solutions were agitated using a stir bar and stir plate. As shown in Table 2, it was determined by separation studies that the materials in solution formed micelles at a concentration of 3000 ppm or greater and selectively adsorbed boron. The boron bonded materials were separated from the solutions using ESNA2 nanofiltration membranes and the boron concentrations of the aqueous solution permeates were analyzed using ICAP.

TABLE 2

Boron rejection of Various HGE-MGA Solutions

| HGE-MGA Concentration (ppm) | Stoichiometric Ratio boron atoms:boron binding functional groups | Solution state | Flux (gfd) | Boron rejection (%) |
|---|---|---|---|---|
| 0 | Base line | Clean | 125.6 | 2.83 |
| 300 | 1:10 | Milky | 142.0 | 28.68 |
| 1500 | 1:50 | Milky | 73.7 | 80.19 |
| 3000 | 1:100 | Precipitation | 43.7 | 98.43 |
| 4500 | 1:150 | Precipitation | 78.1 | 99.98 |

Figure 4:
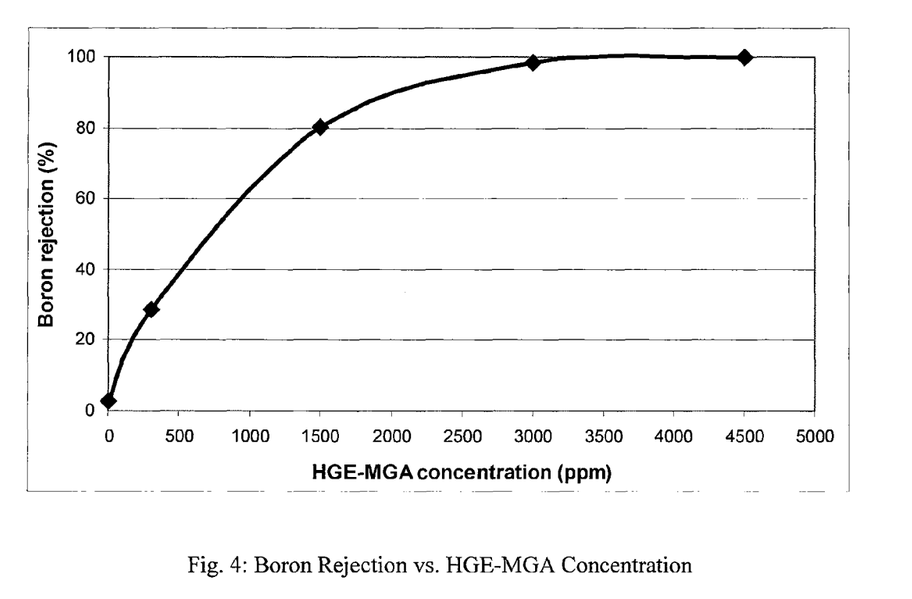
FIG. 4 is a graph of boron rejection vs. concentration of HGE-MGA material according to one embodiment of the present invention.

FIG. 4 depicts a graph of boron rejection vs. the concentration of HGE-MGA material. The HGE-MGA material provided dramatic boron adsorption from the aqueous solutions. It was observed that the percent rejection of boron in the solutions increased dramatically as the concentration of inventive material in the solutions increased. When the concentration of HGE-MGA material in the solutions was 3000 ppm or greater, the boron rejection was nearly 100% (i.e., all the boron had been removed from the solution). It would be expected that similar results would be observed for solutions having different boron concentrations and/or salinities.

EXAMPLE 6

Effect of pH on Boron Adsorption

An aqueous solution was prepared containing 3000 ppm of the HGE-MGA material prepared in Example 1, 10 ppm boron, and 1500 ppm sodium chloride. The pH value of the solution was steadily reduced from 8.0 (the natural starting pH for the solution) to 2.0 using HCl and the residual amount of boron in solution at each pH was measured by ICAP. Other steps and conditions were identical to those described in Example 4.

Figure 5:
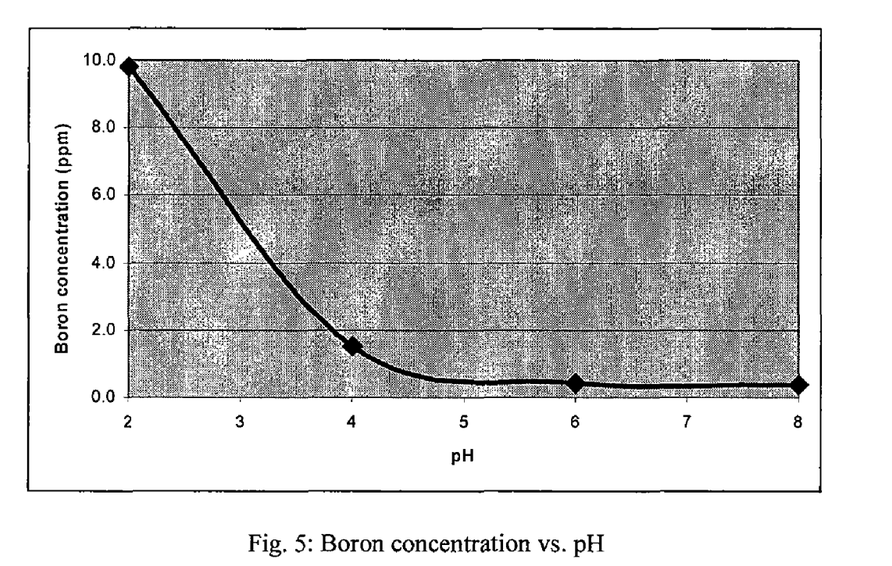
FIG. 5 is a graph showing the effect of pH on residual boron concentration according to one embodiment of the present invention.

The effect of pH on the residual boron concentration in the permeate is depicted in FIG. 5. It can be seen that the residual amount of boron in the permeate remained nearly constant for pH levels between 5 and 8. However, as the pH was decreased below 5, the boron concentration increased, and showed a dramatic increase at pH levels below 4, which is indicative of low adsorption of boron by the inventive materials in solution. Accordingly, the boron-bonded inventive materials may be regenerated because they release bonded boron at low pH. Thus, the materials according to the invention can be used repeatedly for removing boron from aqueous solution by adsorption and desorption of boron at basic (neutral) and acidic conditions, respectively.

EXAMPLE 7

Effect of pH on Boron Rejection

An aqueous solution was prepared containing 3000 ppm of the HGE-MGA material prepared in Example 1, 11 ppm boron, and 1500 ppm sodium chloride. The pH value of the solution was steadily reduced from 8.0 (the natural starting pH for the solution) to 2.0 using HCl and the residual amount of boron in the permeate at each pH was measured by ICAP. Other steps and conditions were identical to those described in Example 4.

Figure 6:
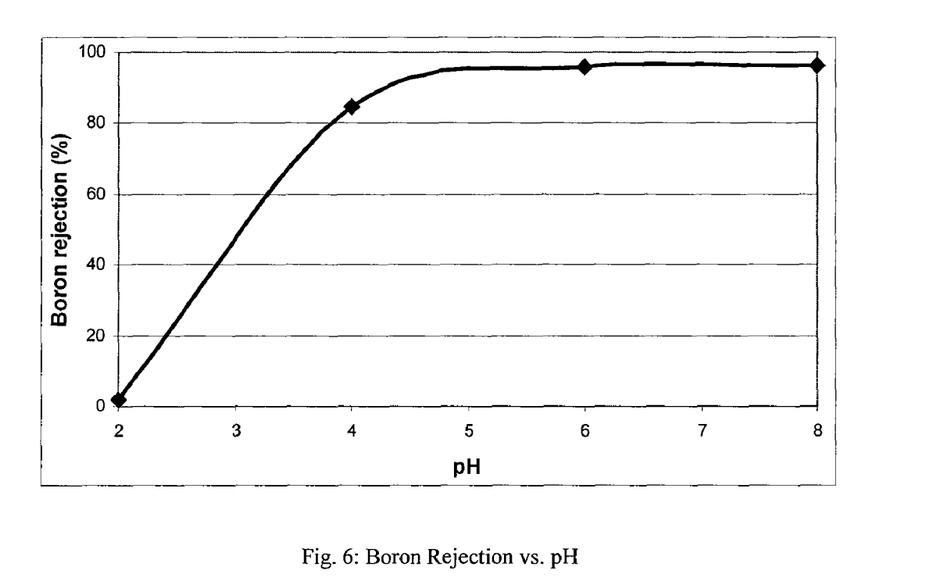
FIG. 6 is a graph showing the effect of pH on boron rejection according to one embodiment of the present invention.

The effect of pH on the boron rejection is depicted in FIG. 6. It can be seen that the boron rejection remained nearly constant (approaching 100%) for pH levels between 5 and 8. However, as the pH was decreased below 5, the boron rejection decreased, and showed a dramatic decrease at pH levels below 4, which is indicative of low adsorption of boron by the inventive materials in solution.

EXAMPLE 8

Effect of Membrane Type on Micelle Removal from Solution

Solutions were prepared at pH 8.0 containing 3000 ppm of the HGE-MGA material described in Example 1, 10 ppm boron, and 1500 ppm sodium chloride. The solution cloudiness was indicative that the inventive materials formed micelles in the solutions. The boron-bonded micelles were separated using nanofiltration or ultrafiltration membranes. As shown in Table 3, the micelles of HGE-MGA material could be easily separated using either a nanofiltration membrane or an ultrafiltration membrane, depending on the process conditions desired.

TABLE 3

Passage of the HGE-MGA Micelles through Membranes

| Membrane type | | Passage of micelle | Boron rejection (%) |
|---|---|---|---|
| Nanofiltration membrane | ESNA 2 | 0% | 98.4 |
| Ultrafiltration membrane | PES 10k (MWCO: 10,000) | <1% | 96.0 |

EXAMPLE 9

Regeneration of Micelles

Figure 7:
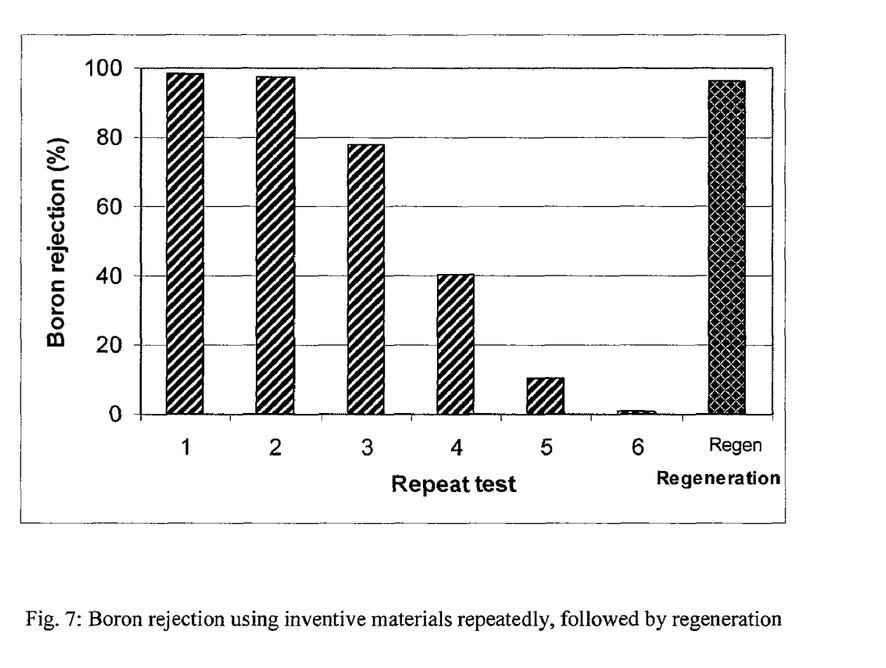
FIG. 7 is a graph of boron reduction using micelles according to one embodiment of the present invention.

A solution were prepared at pH 8.0 containing 3000 ppm of the HGE-MGA material described in Example 1, 10 ppm boron, and 1500 ppm sodium chloride. Following passage through a ESNA2 membrane, the permeate was analyzed to determine boron rejection. As shown in FIG. 7 (Bar 1) and Table 4, the rejection was 98.2%. The material was recovered using an UF membrane and the recovered material was then added to a fresh solution containing 10 ppm boron and 1500 ppm NaCl and the process repeated (see Bar 2). It can be seen that after the 6th iteration, essentially no rejection of boron occurred, indicating that the micelles were saturated. That is, the micelles initially possess excess boron adsorbing capacity. As the boron becomes bound, they begin to lose the ability to bind boron. Eventually, the sites will be filled with boron and no more will be adsorbed, at which time the membrane rejection will drop greatly.

The pH of the concentrated micelle solution containing the bound boron was then reduced to 2.0 and the material was separated from the solution containing the now unbound boron at this pH using a fine (NF or tight UF) membrane. The regenerated material was then evaluated under the same process conditions and found to exhibit nearly the same boron adsorption ability as the original material.

TABLE 4

Regeneration of HGE-MGA Micelles

| HGE-MGA | Repeat test | | | | | | |
|---|---|---|---|---|---|---|---|
| (3000 ppm) | 1st | 2nd | 3rd | 4th | 5th | 6th | Regeneration |
| Boron rejection (%) | 98.2 | 97.6 | 78.0 | 40.3 | 10.5 | 0.9 | 96.2 |

These examples demonstrate the straightforward method by which the micelles according to the present invention may be prepared, as well as the ease of boron removal using such micelles. It may be seen that significant boron reduction may be achieved using the inventive materials. Further, the materials may be easily regenerated once they become saturated.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A method for reducing a boron concentration in a boron-containing aqueous liquid, the method comprising:
    (a) administering at least one micelle for selective boron adsorption to the boron-containing aqueous liquid to produce at least one boron-bonded micelle, wherein the at least one micelle comprises a reaction product of an N-substituted-glucamine and a glycidyl ether;
    (b) passing the micelle-containing aqueous liquid through a membrane to separate the at least one boron-bonded micelle from the aqueous liquid; and
    (c) recovering a permeate from the membrane, wherein the permeate has a reduced boron concentration.

2. The method according to claim 1, wherein the boron-containing aqueous liquid is a high salinity liquid.

3. The method according to claim 1, wherein the boron-containing aqueous liquid has a boron concentration of about 3 to about 100 ppm.

4. The method according to claim 1, wherein the at least one micelle for selective boron adsorption comprises at least one boron adsorbing group, and wherein step (a) comprises administering the at least one micelle to the boron-containing aqueous liquid at a ratio of boron adsorbing groups to boron in the aqueous liquid of at least about 10 to 1.

5. The method according to claim 4, wherein the ratio is at least about 50 to 1.

6. The method according to claim 5, wherein the ratio is at least about 100 to 1.

7. The method according to claim 1, wherein the glycidyl ether is selected from the group consisting of glycidyl alkyl ethers and glycidyl aryl ethers.

8. The method according to claim 7, wherein the glycidyl ether is selected from the group consisting of glycidyl hexadecyl ether and glycidyl 4-nonylphenyl ether.

9. The method according to claim 1, wherein the N-substituted-glucamine is selected from the group consisting of substituted and unsubstituted N-alkyl-glucamines and N-aryl-glucamines.

10. The method according to claim 9, wherein the N-substituted-glucamine is an N-alkyl-glucamine, and wherein the alkyl group contains about 1 to about 20 carbon atoms.

11. The method according to claim 1, wherein the at least one micelle comprises a hydrophobic tail and a head comprising hydrophilic functional groups.

12. The method according to claim 11, wherein the hydrophilic functional groups have Formula (I):

$$R_1\text{—O-A} \tag{I}$$

wherein $R_1$ represents a hydrocarbon group selected from the group consisting of substituted and unsubstituted aromatic, linear aliphatic, and branched aliphatic hydrocarbon groups and mixtures thereof, and wherein A comprises hydroxyl and amine groups.

13. The method according to claim 12, wherein $R_1$ has Formula (IV):

$$C_nH_{2n+1}(C_6H_4)_xC_mH_{2m}\text{—} \tag{IV}$$

wherein n is an integer from 8 to 20, x is an integer from 0 to 2, and m is an integer from 0 to 5.

14. The method according to claim 11, wherein the hydrophilic functional groups have Formula (II):

$$R_1\text{—O-}A_2\text{-N}(R_2)\text{-}A_1 \tag{II}$$

wherein $R_1$ and $R_2$ may be the same or different and each represents a hydrocarbon group selected from the group consisting of substituted and unsubstituted aromatic, linear aliphatic, and branched aliphatic hydrocarbon groups and mixtures thereof, and wherein $A_1$ and $A_2$ may be the same or different and each comprises hydroxyl groups.

15. The method according to claim 14, wherein $R_2$ has Formula (V):

$$C_nH_{2n+1} \tag{V}$$

wherein n is an integer from 1 to 4.

16. The method according to claim 14, wherein the hydrophilic functional group ($A_1$) has Formula (VI):

$$\text{—}C_6H_8(OH)_5 \tag{VI}$$

17. The method according to claim 11, wherein the hydrophilic functional groups have Formula (III):

$$R_1\text{—O—}CH_2CH(OH)CH_2\text{—}NR_2\text{-}A_1 \tag{III}$$

wherein $R_1$ and $R_2$ may be the same or different and each represents a hydrocarbon group selected from the group consisting of substituted and unsubstituted aromatic, linear aliphatic, and branched aliphatic hydrocarbon groups and mixtures thereof, and wherein $A_1$ comprises hydroxyl groups.

18. The method according to claim 1, wherein the permeate has a boron concentration of less than about 2 ppm.

19. The method according to claim 1, comprising before step (a) reacting the N-substituted-glucamine with the glycidyl ether to produce the at least one micelle for selective boron adsorption.

20. The method according to claim 1, wherein the membrane is a nanofiltration membrane or an ultrafiltration membrane.

21. The method according to claim 1, wherein the method is performed at a pH of greater than about 4.5.

22. The method according to claim 21, wherein the method is performed at a pH of about 8.0.

23. The method according to claim 1, further comprising step (d) adding the at least one boron-bonded micelle to an acidic solution and filtering the solution to yield at least one regenerated micelle for selective boron adsorption.

24. The method according to claim 23, further comprising step (e) repeating steps (a) to (c) with the at least one regenerated micelle for selective boron adsorption.

* * * * *